United States Patent [19]

Goman et al.

[11] Patent Number: 5,296,275
[45] Date of Patent: Mar. 22, 1994

[54] PHOTOTRANSCHROMIC INK

[75] Inventors: Peter M. Goman; Sunil Sirdesai, both of San Diego, Calif.

[73] Assignee: Xytronyx, Inc., San Diego, Calif.

[21] Appl. No.: 907,148

[22] Filed: Jul. 1, 1992

[51] Int. Cl.$^5$ .................. C09D 11/10; C09D 11/02
[52] U.S. Cl. ............................ 428/29; 250/474.1; 250/482.1; 430/18; 430/332; 430/336; 430/338; 430/340; 430/346; 524/260; 524/354
[58] Field of Search .................. 524/260, 354; 250/474.1, 482.1; 427/145, 155, 151, 152, 412.1; 430/338, 340, 346, 336, 332, 18; 428/29

[56] References Cited

U.S. PATENT DOCUMENTS 5,028,792 7/1991 Mullis ........................ 250/482.1

*Primary Examiner*—Veronica P. Hoke
*Attorney, Agent, or Firm*—Lyon & Lyon

[57] ABSTRACT

A phototranschromic ink suitable for use in a printing machine, including a water soluble, inert, nonionic polymeric resin carrier base having film forming properties, a photo acid or photo base progenitor which releases or takes up protons upon exposure to light, a pH sensitive dye which changes color in response to a change in proton levels, a water compatible non-ionic wetting agent, a water compatible non-ionic thickening agent, a neutral water soluble flow aid; wherein said ink changes color upon exposure to ultraviolet radiation and is of suitable consistency for use in a printing machine.

20 Claims, 2 Drawing Sheets

PHOTOTRANSCHROMIC INK

BACKGROUND OF THE INVENTION

This invention relates to systems designed to measure exposure to ultraviolet radiation.

Mullis, U.S. Pat. No. 5,028,792, describes a system for the visualization of exposure to ultraviolet light radiation, in which a combination of polyvinyl alcohol, an acid sensitive dye, and a bisulfite adduct of an ortho-nitro substituted aromatic aldehyde are provided. This mixture changes from one color to a different color upon exposure to ultraviolet radiation. This color change reflects the effect of ultraviolet light radiation on the aldehyde to cause an increase in acidity. This increase in acidity in turn causes the acid sensitive dye to change color, and thus provide a visual signal of exposure to ultraviolet light. In one example (Example 23) a phototranschromic ink was made by forming a mixture of diethylene glycol, polyvinyl alcohol, an ortho-nitrobenzaldehyde, and bromophenol blue. This ink was applied to paper with a brush.

SUMMARY OF THE INVENTION

This invention provides a phototranschromic ink which is suitable for use in a printing machine, including for use in processes such as silk screening, or those involved with a letter press machine, a flexigraphic process, or an offset process. Specifically, in a first aspect, the invention features a phototranschromic ink which is formed from a water soluble, inert and non-ionic polymeric resin carrier base having film forming properties. That is, the base is of sufficiently high molecular weight to form a continuous layer of molecules, rather than separated areas containing one or more molecules. The ink also contains a photoacid or photobase progenitor (which releases or takes up protons upon exposure to a desired light, e.g., ultraviolet light), a pH sensitive dye (which changes color in response to a change in proton levels), a water compatible non-ionic wetting agent, a water compatible non-ionic thickening agent, and a neutral water-soluble flow aid. The wetting agent, thickening agent and flow aid all cooperate with the dye to allow the dye to change color in response to a change in proton level. In addition, the photoacid or photobase progenitor, dye, wetting agent, thickening agent and flow aid all cooperate to provide a phototranschromic ink which changes color upon exposure to ultraviolet radiation, and is of suitable consistency for use in a printing machine.

By "phototranschromic ink" is meant a fluid ink which provides a sufficiently high color density for use in a printing machine, and in particular, existing commercial printing presses such as those described above. Such a color density provides a clear visual change which can be readily discerned by an unaided average human eye. For example, it provides a significant densitometer reading on a Hunter color scale. Examples of such inks are provided below. For example, an ink suitable for silk screening provides a heavy coat of a less color dense ink, while an ink suitable for use in a flexigraphic process or letter press machine is of much greater color density and is applied in a lighter coat. Those in the art will recognize the meaning and scope of these terms.

In preferred embodiments, a light dosimeter (e.g., a UV dosimeter) is formed by applying the phototranschromic ink to a substrate. Such a substrate is any plastic or coated paper product having an inert substrate surface compatible with the phototranschromic ink by allowing ph-related color changes to freely occur. That is, the product must have little or no buffering capacity and preferably be of neutral pH, so that pH changes can occur unhindered within the ink. Examples of such substrates include corona-treated polyolefin films and commercially available label stock, such as polyester top-coated for water based inks (Compucal II from Flexcon Co., or 3M Co.'s No. 7780 and No. 7888 label stock).

The phototranschromic ink of this invention is advantageous over those described by Mullis, supra, since it allows printing of any desired shape or pattern, examples of which are provided in the FIGURES attached hereto. In addition, the phototranschromic inks of this invention allow formation of such shapes with a high percentage of acceptable product. Thus, the inks of the present invention are considerably more versatile than those described by Mullis, and provide inks which can be used in a commercial printing process to produce a film that is visible to the unaided human eye, and adapted for formation of any desired shape or pattern of ink.

In other preferred embodiments, a spectral shaping filter is provided in or on the phototranschromic ink or light dosimeter, by incorporating a chemical that selectively absorbs light of certain wavelengths and transmits others. Preferably, this filter is provided in a pressure sensitive adhesive formulation and the adhesive coated on a clear polypropylene film. The adhesive preferably is an inert, non-ionic, pressure sensitive solvent- or water-based adhesive with no buffering capacity so that it will not affect the light sensitivity of the phototranschromic ink. Examples of such adhesives are National Starch Durotak 2434, Ashland Chemical Company's Aeroset grades (both acrylic resin based adhesive in organic solvents), and Morton Thiokol's Morstik grades of acrylic water based emulsions.

Examples of chemical spectral filters include Uvitex OB (Ciba-Geigy) which absorbs in the UVA (320–400 nm) light region, and dimethoxy benzaldehyde, n-butyl-p-aminobenzoate, stituted 2-hydroxybenzophenones (Cyasorb ® series from American Cyanamid Co.), and butylmethoxydibenzoylmethane (Parasol 1789 from Givaudin Co.) and the like.

By "polymeric resin carrier base" is meant that the polymeric resin acts as a carrier vehicle and binder for the other active ingredients. The resin must be water soluble, inert and non-ionic and have good film forming properties. Examples include polyvinyl alcohol, polyvinyl acetate, polyvinyl pyrrolidone and copolymers with vinyl acetate, polyethylene oxide, polyurethane dispersions and acrylic emulsions. Such carrier base is generally provided in an amount between 5-10 wt %, most preferably between 6-8 wt %.

By "photoacid or photobase progenitor" is meant a chemical which releases or takes up protons upon exposure to light. Examples of UV sensitive photoacid progenitors include ortho-nitrobenzaldehyde, and/or derivatives of ortho-nitrobenzaldehyde, such as 2,4-dinitrobenzaldehyde, 2,6-dinitrobenzaldehyde and ortho-nitrocinnamaldehyde. These aldehydes may be used as the sodium bisulfite adduct to enhance water solubility. Such progenitors are generally provided in an amount between 0.5-10 wt %, most preferably between 2-5 wt %.

By "pH sensitive dye" is meant one or more water soluble chemicals which change color dependent upon pH, preferably with sharp color changes over a little pH range. Examples include bromophenol blue, phenol red, thymol blue, ethyl orange, m-Cresol purple, New Fuchsin, p-methyl red, lissamine green, or combinations of dyes for multiple color changes. Such dyes are generally provided in an amount between 1–5 wt %, most preferably between 1.5–3 wt %.

By "wetting agent" is meant a water compatible nonionic fluid that does not interfere with the acid/base chemistry of the pH sensitive dyes. Examples include surfactants and dispersing agents, such as low molecular weight copolymers of polyalkylene oxide-modified methylpolysiloxanes (e.g., the Union Carbide Silwet ® L-series), Fluoroaliphatic polymeric esters (e.g., the Fluorad ® series from 3M Co.), and polyoxyethylene ether (e.g., the Triton-X series from Rohm and Haas). These terms are well known in the art. Such wetting agents are generally provided in an amount between 0.1–3.0 wt %.

By "thickening agent" is meant a viscosity modifier which is water compatible, non-ionic and inert to the acid/base chemistry of the dyes. Examples include polyurethane dispersions (e.g., the non-ionic Acrysol ® Rm-series from Rohm and Haas which are unbuffered). Such thickening agents are generally provided in an amount between 0–2 wt %, most preferably between 0.1–1 wt %.

By "flow aid" is meant a neutral, water soluble solvent, e.g., glycols (e.g., diethylene glycol), gum esters, and ester alcohols such as pentane diol esters (Texanol ® from Kodak Co.), which are used to provide consistency and flow characteristics. Such flow aids are generally provided in an amount between 50–95 wt %, most preferably between 60–75 wt %.

In preferred embodiments, various pigments, dyes and/or other additives may be provided in the ink. These include pigments, colored dyes and other additives such as hiding compounds (compounds which cover imperfections beneath the ink, e.g., Titanium dioxide), metallic reflective powders (i.e., light reflecting metal powders), and fluorescent brighteners (which fluoresce and make the ink appear brighter, e.g., Uvitex ® OB from Ciba-Geigy Co.) which enhance the appearance, stability or utility of the ink. Such additives are generally provided in an amount between 0–2 wt %.

In a second aspect, the invention features a method for producing a UV dosimeter by providing a phototranschromic ink sensitive to uv light, and applying that ink with a printing machine to a substrate. In preferred embodiments, the phototranschromic ink is as described above, and a spectral filter and adhesive are provided as described above.

In a third related aspect, the invention features a method for monitoring ultraviolet radiation on a surface, by providing a phototranschromic ink on a substrate and monitoring the change in color of the ink upon exposure to ultraviolet radiation. Preferably, the phototranschromic ink is formed as described above, and optionally has a spectral filter and adhesive applied thereto.

Other features and advantages of the invention will be apparent from the following description of the preferred embodiments thereof, and from the claims.

DESCRIPTION OF THE PREFERRED EMBODIMENTS

The drawings will first briefly be described.

DRAWINGS

Figure 1:
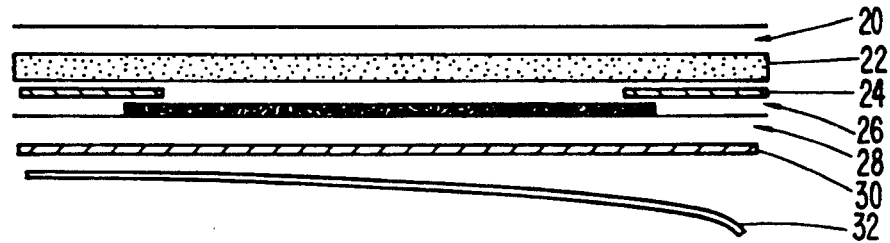
Figure 2:
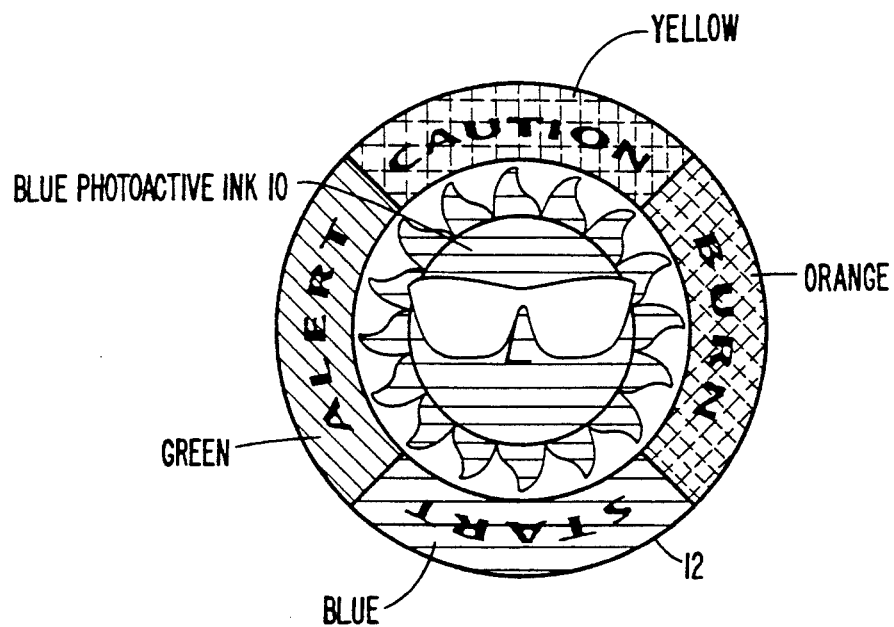
Figure 3:

FIG. 1 is a diagrammatic sectional view of a UV dosimeter formed by use of a phototranschromic ink of the present invention. The following symbols represent the various layers:
20—Clear polypropylene
22—Spectral shaping filter (adhesive+absorber)
24—Printed color guide
26—Printed photoactive ink
28—Coated polyester tape
30—Medical grade adhesive
32—Paper release liner FIGS. 2 and 3 are representations of UV dosimeter badges formed by a process of the present invention. The following symbols represent the various inks:
A—UV sensitive ink (#7); screen printed
B—UN symbol green ink; letterpress printed
C—Green ink; letterpress printed
D—Amber ink; letterpress printed
E—Red ink; letterpress printed
F—Black ink; letterpress printed

PHOTOTRANSCHROMIC INK

Phototranschromic inks of this invention are generally described above. Examples of various resins, dyes and photoacid progenitors that might be used within such phototranschromic inks are provided in Mullis, supra, hereby incorporated by reference herein. There follow specific examples of such inks. These examples are not limiting in this invention. Those in the art can readily prepare equivalent inks using similar chemicals by art-known procedures.

EXAMPLE 1

Ink Formulations

Ink Formulations were prepared in the following manner:

A finely powdered mixture of sodium bisulfite (5.2 g, 475 mmol) and O-nitrobenzaldehyde (7.1 g, 448 mmol) was added to a Polyvinyl alcohol (PVA) solution (108 g of a 10% solution of 50,000–60,000 molecular weight PVA in water). The mixture was stirred for two hours until a clear solution resulted. Bromophenol blue sodium salt (1.42 g, 19.5 mmol) and meta-cresol purple (0.15 g, 3.5 mmol) were added to the solution in powdered form, and stirring continued for an additional hour. A surfactant from the polyalkylene oxide-modified methylpolysiloxanes family (1.5 g of Silwet L-7602 from Union Carbide), a polyurethane dispersion viscosity modifier (0.86 g of Acrysol RM-825 from Rohm and Haas), and a diol ester solvent (7.2 g of Texanol from Eastman Kodak) was then added and stirring continued for an additional 1.5 hours. The homogeneous mixture was then filtered through a fine polyester screen of mesh size 6xx. The viscosity of the mixture (called Formulation 1) as measured by a Brookfield viscometer using a #63 spindle, was 13,600–14,500 cps.

Ink formulations 2–17 (shown in the table below) were prepared in the same way as above with concentrations of various ingredients adjusted appropriately, and with substitution or inclusion of various dyes. (Amounts in the following table are in grams.)

| POLYVINYL ALCOHOL | FORMULATION | | | |
|---|---|---|---|---|
| | #2 | #3 | #4 | #5 |
| 5% sol in water | 72 | 72 | — | — |
| 10% sol in water | — | — | 96 | 107 |
| ONB/BS Adduct | 11.01 | 11.01 | 14.86 | 16.47 |
| Conc. Dye Sol | 10.04 | 10.04 | 13.3 | 15.03 |
| Silwet L-7602 | 0.5 | 1.0 | 2.67 | 1.5 |
| Acrysol RM 825 | 0.57 | 0.57 | 1.53 | 0.86 |
| Texanol | — | — | — | 4.4 |
| ONB/BS - | Crystalline 1:1 adduct of O-nitrobenzaldehyde and Sodium bisulfite. | | | |
| Conc. Dye Sol - | 11.1 g Bromophenol blue and 3.21 g of m-Cresol purple in 1 liter of water. | | | |

| POLYVINYL ALCOHOL | FORMULATION | | | |
|---|---|---|---|---|
| | #6 | #7 | #8 | #9 |
| 10% sol in water | 108 | 108 | 108 | 108 |
| O-Nitobenzaldehyde | 6.46 | 7.1 | 7.1 | 7.1 |
| Sodium bisulfite | 4.75 | 5.2 | 5.2 | 5.2 |
| Bromophenol blue | 0.34 | 1.42 | — | — |
| m-Cresol Purple | 0.90 | 0.07 | — | — |
| Thymol Blue | — | 0.07 | — | — |
| Ethyl Orange | — | — | 1.5 | 0.5 |
| New Fuchsin | — | — | — | 0.5 |
| Silwet L-7602 | 1.30 | 1.5 | 1.5 | 1.5 |
| Acrysol RM 825 | 0.86 | 0.86 | 0.86 | 0.86 |
| Texanol | 8.5 | 7.2 | 7.2 | 7.2 |
| Color Change | Green Amber Red | Blue Green Yellow Orange | yellow Red | yellow Red |

| POLYVINYL ALCOHOL | FORMULATION | | | |
|---|---|---|---|---|
| | #10 | #11 | #12 | #13 |
| 10% sol in water | 108 | 108 | 108 | 108 |
| O-Nitrobenzaldehyde | 7.5 | 57.1 | 7.1 | 7.1 |
| Sodium bisulfite | 5.5 | 5.2 | 5.2 | 5.2 |
| para-Methyl Red | 1.0 | — | — | — |
| Bromocresol purple | 1.1 | — | — | — |
| Ethyl Orange | — | — | 0.75 | 0.75 |
| Alphazurine | — | 0.75 | — | — |
| Fast Green FCF | — | — | 0.75 | — |
| Lissamine Green | — | — | — | 0.75 |
| Silwet L-7602 | 3.8 | 1.5 | 1.5 | 1.5 |
| Acrysol RM 825 | — | 0.86 | 0.86 | 0.86 |
| Texanol | — | 7.2 | 7.2 | 7.2 |
| Color Change | Green Amber Red | Green Purple | Green Purple | Green Purple |

| POLYVINYL ALCOHOL | FORMULATION | | | |
|---|---|---|---|---|
| | #14 | #15 | #16 | #17 |
| 10% sol in water | 108 | 108 | 108 | 108 |
| O-Nitrobenzaldehyde | 7.5 | 57.1 | 7.1 | 7.1 |
| Sodium bisulfite | 5.5 | 5.2 | 5.2 | 5.2 |
| Congo Red | 1.0 | — | — | — |
| Indocyanine Green | — | 0.75 | — | — |
| Methyl Orange | — | 0.75 | — | 0.75 |
| Lissamine Green | — | — | 1.5 | — |
| Variamine Blue RT | — | — | — | 0.75 |
| Silwet L-7602 | 1.5 | 1.5 | 1.5 | 1.5 |
| Acrysol RM 825 | 0.86 | 0.86 | 0.86 | 0.86 |
| Texanol | 7.2 | 7.2 | 7.2 | 7.2 |
| Color Change | Red Blue | Green Purple | Green Aqua | Green Purple |

Letterpress, flexographic, offset or lithographic, gravure, flat-bed or rotatory screen press printing or ink-jet printing processes can be used for printing images with the above ink formulations. A variety of coating techniques such as gravure & reverse gravure, wire rod, knife-overroll or reverse roll coating can be used to coat substrates. The color density of resulting printed images or coatings were compared using the L,a,b color chart on a Hunter Colorquest Spectrocolorimeter with a halogen cycle lamp or a similar densitometer. Inks which provide similar color chart values as those formulations above are useful in this invention.

EXAMPLE 2

Screen Printing

A sample of the ink formulation #5 was screened on top-coated polyester (Compucal II Flexcon material) using a 355 mesh polyester screen on a mechanical press and dried to the touch with warm air.

Hunter L, a*, b* color scale was used to determine color and density. This system gives measurement of color in units of approximate visual uniformity throughout the color solid. Thus, L measures lightness and varies from 100 for perfect white to zero for black, approximately as the eye would evaluate it. The chromaticity dimensions (a* and b*) give understandable designations of color as follows: a* measures redness when plus, gray when zero and greenness when minus; and b* measures yellowness when plus, gray when zero and blueness when minus.

Four readings were taken on three separate sample swatches for a total of twelve readings against a standard instrument calibrated grey scale.

| | Lamp source - 10D65, Small Aperture | | | |
|---|---|---|---|---|
| Average Sample | Std Dev | Samp Range Min | Samp Range Max | |
| L 79.55 | L 0.14 | L 79.30 | L 79.75 | |
| a* −0.21 | a* 0.07 | a* −0.33 | a* −0.07 | |
| b* −7.10 | b* 0.12 | b* −7.32 | b* −6.78 | |

| | Lamp source - 10D65, Large Aperture | | | |
|---|---|---|---|---|
| Average Sample | Std Dev | Samp Range Min | Samp Range Max | |
| L 46.51 | L 0.90 | L 44.92 | L 48.15 | |
| a* 0.69 | a* 0.61 | a* −0.15 | a* 1.65 | |
| b* −35.23 | b* 0.85 | b* −36.28 | b* −33.45 | |

EXAMPLE 3

UVB dosimeter fabrication

Inks from formulations #2–5 were printed as a 6 inch square swatch on an inert top-coated polyester substrate by mechanical screen process (#355 mesh polyester screen) and air dried for 18 hours. The printed substrate was then laminated with a film of acrylic adhesive (Ashland Chemical Aroset-1018) of coating weight 32 g/m² which contained a chemical light filter (Uvitex ®-OB) at a concentration of 0.5 wt % (based on adhesive solids compounded into the adhesive solution prior to coating on a release liner). This filter absorbs all the UVA (320–400 nm) energy passing through, but transmits some of the UVB so that the dosimeter is responsive to mainly UVB energy. A film of polypropylene of 1.2 mil thickness which transmits all UVB and UVA was then laminated over the adhesive layer. The final laminate was then cut into smaller rectangles of approximately 2"×1" for exposure testing.

Samples of the fabricated dosimeter were mounted on a tripod stand facing perpendicular to the sun's rays, and the UVB energy necessary for the color to change from Blue to Green to Yellow to Orange was recorded. All outdoor testing was carried out between the hours of 10:30 AM and 3:00 PM in San Diego. UVB energy was measured using a Research Radiometer (IL1700) together with an Erythemal probe, obtained from the International Light Co., Newburyport, Mass., which measures UVB at a peak intensity of 290 nm. Alternatively, an Erythema Ultraviolet Dose and Intensity meter (Model 5D), obtained from the Solar Light Co., Inc., Philadelphia, PA was used. This meter reads the UVB energy flux in MED units (Minimum Erythemal Dose) and integrates this unit with time. The total energy in milljoules (mi) can be obtained using a conversion factor of 21±3 mJ per MED for a Type II skin.

A solar simulator, obtained from the Oriel Corporation, Stratford, Conn., which consists of a 1 KW Xenon arc light source and appropriate optics and Air Mass filters to closely simulate the solar spectrum, particularly the Solar UV spectrum, was also used for dosimeter testing and calibration. The UVB intensity of the light source was measured as described above.

|  | FORMULATION | | | |
|---|---|---|---|---|
|  | #2 | #3 | #4 | #5 |
| Viscosity (cps) (Brookfield #63) | 60 | 100 | 1000–1400 | 1200–1600 |
| UVB energy required to cause color change in Dosimeter (mJ @ 290 nm peak) | | | | |
| Blue | 0 | 0 | 0 | 0 |
| Green | 7.0 | 4.0 | 5.0 | 4.5 |
| Yellow | 27.5 | 16.0 | 24.5 | 17.0 |
| Orange | 68.0 | 29.0 | 44.0 | 42.0 |

EXAMPLE 4

UV Dosimeter

Referring to FIG. 1, there is shown a section of an ultraviolet dosimeter formed by screen printing using a phototranschromic ink of this invention. The badge is formed as described above. Referring to FIG. 2, the top surface of the badge shown in FIG. 1 is shown. The phototranschromic ink 10 is formed in the shape of a sun and a color design 12 is formed around the sun, representative of various ultraviolet light exposures.

EXAMPLE 5

UV Dosimeter

Referring to FIG. 3, formulation #7 was used to print the globe of the United Nations symbol on a continuous web of polyester based label stock with a paper release liner (Compucal II TC329 from Flexcon Co.) using a commercial automatic, continuous screen press. Prior to this, the remainder of the UN symbol and the color guide was printed on the label stock using commercially available UV cured green, amber, red and black inks by an offset printing process. The web was then passed through a drying tunnel set at 60–70° C. drying temperature and laminated in-line with a laminate consisting of an acrylic adhesive (National Starch Duro-tak 2324) containing 0.75 wt % Uvitex ®-OB based on adhesive solids, coated on clear 1.2 mil thick polypropylene at 35 g/m². The individual badges were then die-cut in-line down to the release liner and the waste pulled off.

UVB energy to cause a color change in this Dosimeter in mJ @ 290 nm peak was as follows:
Green—0
Amber—28±3 mJ
Red—75±5 mJ Other embodiments are within the following claims.

We claim:

1. A phototranschromic ink suitable for use in a printing machine, comprising
   a water soluble, inert, non-ionic polymeric resin carrier base having film forming properties,
   a photo acid or photo base progenitor which releases or takes up protons upon exposure to light,
   a pH sensitive dye which changes color in response to a change in proton levels,
   a water compatible non-ionic wetting agent which cooperates with said dye to allow said dye to change color in response to said change in proton levels,
   a water compatible non-ionic thickening agent which cooperates with said dye to allow said dye to change color in response to said change in proton levels,
   a neutral water soluble flow aid which cooperates with said dye to allow said dye to change color in response to said change of proton levels;
   wherein said base, progenitor, dye, wetting agent, thickening agent and flow aid all cooperate to provide an ink which changes color upon exposure to ultraviolet radiation and is of suitable consistency for use in a printing machine.

2. The phototranschromic ink of claim 1, wherein said carrier base is selected from the group consisting of polyvinyl alcohol, polyvinyl acetate, polyvinyl pyrrolidone and copolymers with vinyl acetate, polyethylene oxide, polyurethane dispersions and acrylic emulsions.

3. The phototranschromic ink of claim 1, wherein said photoacid progenitor is selected from the group consisting of ortho-nitrobenzaldehyde, 2,4-dinitrobenzaldehyde, 2,6-dinitrobenzaldehyde and ortho-nitrocinnamaldehyde.

4. The phototranschromic ink of claim 1, wherein said pH sensitive dye is selected from the group consisting of bromophenol blue, phenol red, thymol blue, ethyl orange, m-Cresol purple, New Fuchsin, p-Methyl red, and lissamine green.

5. The phototranschromic ink of claim 1, wherein said wetting agent is selected from the group consisting of low molecular weight copolymers of polyalkylene oxide-modified methylpolysiloxanes, fluoroaliphatic polymeric esters and polyethyleneglycol.

6. The phototranschromic ink of claim 1, wherein said thickening agent is a polyurethane dispersion.

7. The phototranschromic ink of claim 1 wherein said flow aid is selected from the group consisting of glycols, gum esters, and ester alcohols.

8. The phototranschromic ink of claim 1 further comprising a pigment, colored dye, titanium dioxide, metallic reflective powder or fluorescent brightener.

9. A phototranschromic ink suitable for use in a printing machine, comprising
   from about 5–10 weight percent of a water soluble, inert, non-ionic polymeric resin carrier base having film forming properties,
   a photo acid or photo base progenitor which releases or takes up protons upon exposure to light, a pH sensitive dye which changes color in response to a change in proton levels, a water compatible non-ionic wetting agent which cooperates with said dye to allow said dye to change color in response to said change in proton levels, a neutral water soluble flow aid which cooperates with said dye to allow said dye to change color in response to said change of proton levels;

wherein said base, progenitor, dye, wetting agent and flow aid all cooperate to provide an ink which changes color upon exposure to ultraviolet radiation and is of suitable consistency for use in a printing machine.

10. A substrate having an inert surface comprising a phototranschromic ink as defined in claim 1 or 9 applied thereto by a printing machine.

11. The substrate of claim 10 further comprising a spectral filter.

12. The substrate of claim 10 further comprising adhesive.

13. The substrate of claim 12 wherein said adhesive is selected from the group consisting of an acrylic resin based adhesive in an organic solvent and an acrylic water based emulsion.

14. The substrate of claim 10 further comprising a chemical filter.

15. The substrate of claim 14 wherein said filter is selected from the group consisting of dimethoxy benzaldehyde, n-butyl-p-aminobenzoate, substituted 2-hydroxybenzophenones, and butyl-methoxydibenzoylmethane.

16. A method for forming a light dosimeter comprising the step of providing a substrate and applying a phototranschromic ink as defined in claim 1 or 9 thereto with a printing machine.

17. The method of claim 16 wherein the printing machine is selected from the group consisting of a letter press machine, a flexigraphic process, an offset process or silk screening.

18. The method of claim 16 wherein the substrate is any plastic or coated paper product having an inert substrate surface compatible with the phototranschromic ink.

19. The method of claim 16 comprising the step of applying a spectral filter to said substrate.

20. The method of claim 16 comprising the step of applying an adhesive to said substrate.

* * * * *